United States Patent

[11] 3,604,151

[72] Inventors Pierre Ventre;
Andre Reilhac, both of Billancourt, France
[21] Appl. No. 867,991
[22] Filed Oct. 21, 1969
[45] Patented Sept. 14, 1971
[73] Assignees Regie Nationale Des Usines Renault
Billancourt, ;
Automobiles Peugeot
Paris, France
[32] Priority Oct. 31, 1968, Aug. 13, 1969
[33] France
[31] PV 172274 and PV 69/27,873

[54] AUTOMOTIVE WINDOW REGULATORS
12 Claims, 4 Drawing Figs.
[52] U.S. Cl. .................................................. 49/227,
49/351
[51] Int. Cl. ...................................................... E05f 11/52
[50] Field of Search ........................................... 49/227,
226, 351, 40; 74/89, 89.16, 89.17

[56] References Cited
UNITED STATES PATENTS
2,276,427  3/1942  Smye ............................ 49/351
2,925,268  2/1960  Pierce ........................... 49/227
3,332,169  7/1967  Lohr et al. .................... 49/227 X
3,415,016  12/1968 Lystad .......................... 49/227
3,495,357  2/1970  Biabaud ....................... 49/351
FOREIGN PATENTS
867,658  2/1953  Germany ...................... 49/351
Primary Examiner—J. Karl Bell
Attorney—Stevens, Davis, Miller & Mosher ABSTRACT: A window regulator notably for automobiles, of the twin-link-type, characterized in that the links pivoted at one end to the glass-supporting bracket are so actuated that they do not move in parallel relationship in order to cause the glass to follow a curved path.

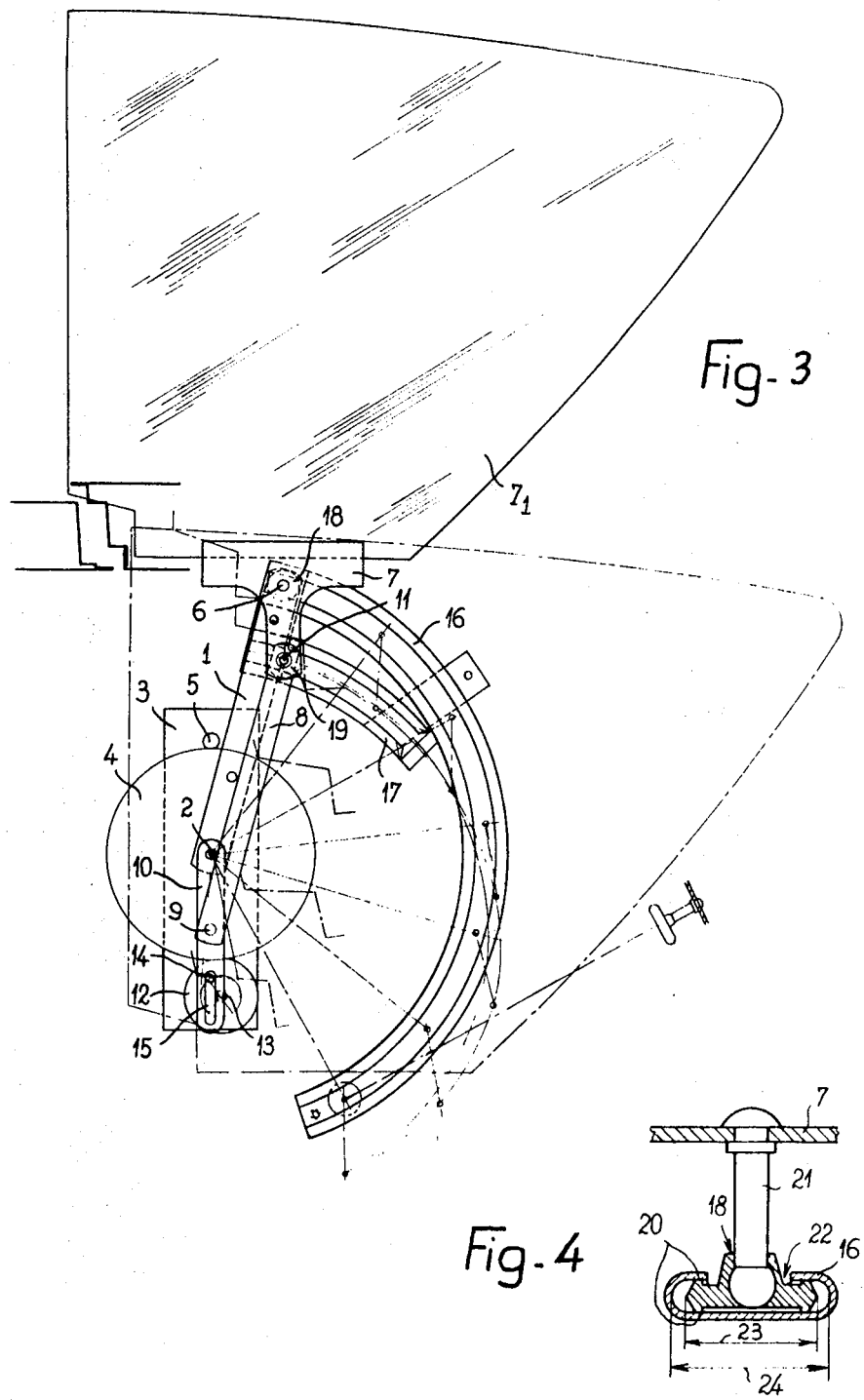

AUTOMOTIVE WINDOW REGULATORS

The present invention relates in general to window regulator mechanisms for automobiles and has specific reference to a window regulator of the type comprising a twin link system adapted to move the glass along a curved path, notably in the case of quarter circle windows of automotive vehicles.

In most instances the glasses of vehicles are moved from their closed position to their open position by following a rectilinear path controlled by substantially vertical glass run channels rigid with the body structure of the vehicle. Parallel or crossed arms control this movement through the medium of rollers engaging horizontal channels rigid with the glass.

However, in certain cases it is desirable to cause the glass to move downwards along a curved path in order to clear body portions and eventually house the glass in narrow recesses at the end of the downward stroke.

This problem is solved by the arrangement constituting the subject-matter of the present invention which is based on the simple principle of twin motion but wherein the connecting links do not move parallel to themselves. The glass positively associated with the position of these links in the space assumes under these conditions different orientations according to the scope contemplated. The arrangement according to this invention utilizes notably, in addition to said pair of main links, a complementary link acting as an adjusting pivot, which is formed with a longitudinal elongated slot receiving and guiding an eccentric pin carried by a pinion meshing with a toothed wheel rotatably solid with or driven from the window winding handle.

Various improvements may be brought to the arrangement broadly set forth hereinabove. These improvements relate to a device for guiding the glass-supporting bracket in a transverse direction and consisting of a pair of guide rails of hollow polygonal girder section having a longitudinal slot formed along one of its main faces, these guide rails coacting with rollers carried by said bracket. One of these rails has:

either the shape of a circular arc concentric to the axis of rotation of the main link when the roller axis is coincident with that of said main link, in the case of planar glass;

or the shape of a cone in the case of a curved glass, the other rail corresponding in shape to the whole or part of the curve described by the axis of the other roller disposed at any suitable point on the glass-supporting bracket.

Other features characterizing this invention will appear as the following description proceeds, this description being given by way of illustration with reference to the attached drawing in which:

FIG. 3 illustrates the mechanism according to this invention which comprises certain modifications with respect to the structure of FIG. 1 and 2, and FIG. 4 shows in cross-sectional view a driving roller in its guide rail.

Figure 1:
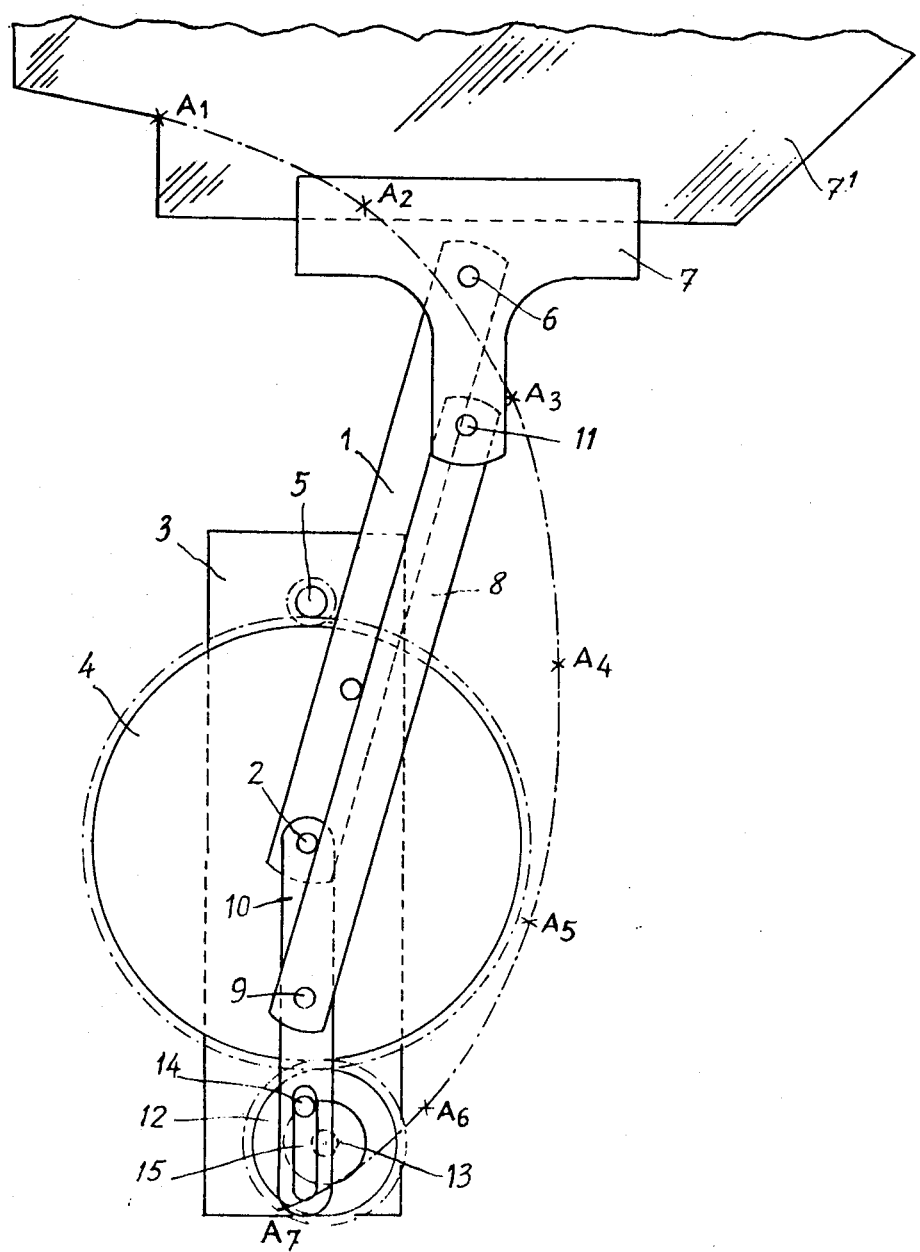
FIG. 1 illustrates the winding regulator mechanism according to a first form of embodiment of this invention.

Referring first to FIG. 1, it will be seen that the window glass regulator for automotive vehicles comprises a main link 1 having at one end a fixed pivot pin 2 carried by the mounting plate 3, this link 1 being on the other hand rigid with a toothed wheel 4 rotatably driven from the winding handle pinion 5 and having a movable pivot pin 6 at its opposite end; this pivot pin 6 is carried by the bracket 7 supporting, or rigid with, the glass $7^1$. The main link 1 may include a spiral compensating spring (not shown). A secondary link 8 which in the closed position is substantially parallel to the main link 1, has on the one hand a movable pivot pin 9 carried by a complementary link 10 pivotally mounted by means of the pin 2, and on the other hand a movable pivot pin 11 carried by the bracket 7.

A small toothed wheel 12 journaled on a fixed shaft 13 is in constant meshing engagement with the larger toothed wheel 4 and carries an eccentric pin 14 adapted to oscillate the complementary link 10 by engaging an elongated longitudinal slot 15 formed in said complementary link 10.

This specific form of embodiment of the invention operates as follows:

The winding handle pinion 5 drives the large toothed wheel 4 which drives in turn the main link 1 and the small toothed wheel 12 meshing with said wheel 4. This small wheel 12, via the eccentric pin 14 engaging the slot 15, causes the complementary link 10 to which the secondary link 8 is pivoted to assume a more or less inclined position either to the left or to the right, according to the direction of rotation of the driving pinion 5.

Under these conditions, the axis of pivot pin 6 describes a circular arc about the fixed axis of pivot pin 2. Besides, the axis of pin 11 describes a circular arc about the movable pivot pin 9. As the bracket 7 is rigid with the glass, the glass is tilted in the direction and with the amplitude controlled by the oscillations of complementary link 10.

Thus, the path obtained is subordinate, without any limitation as to shape, by:

a. the radial position of eccentric pin 14, b. the initial position of this pin, c. the ratio selected for the diameters of the large toothed wheel 4 and small toothed wheel 12, d. the shape of slot 15.

The curve $A_1, A_2, A_3......A_7$ shows the path followed by the same point of the glass from its uppermost to its lowermost position.

Figure 2:
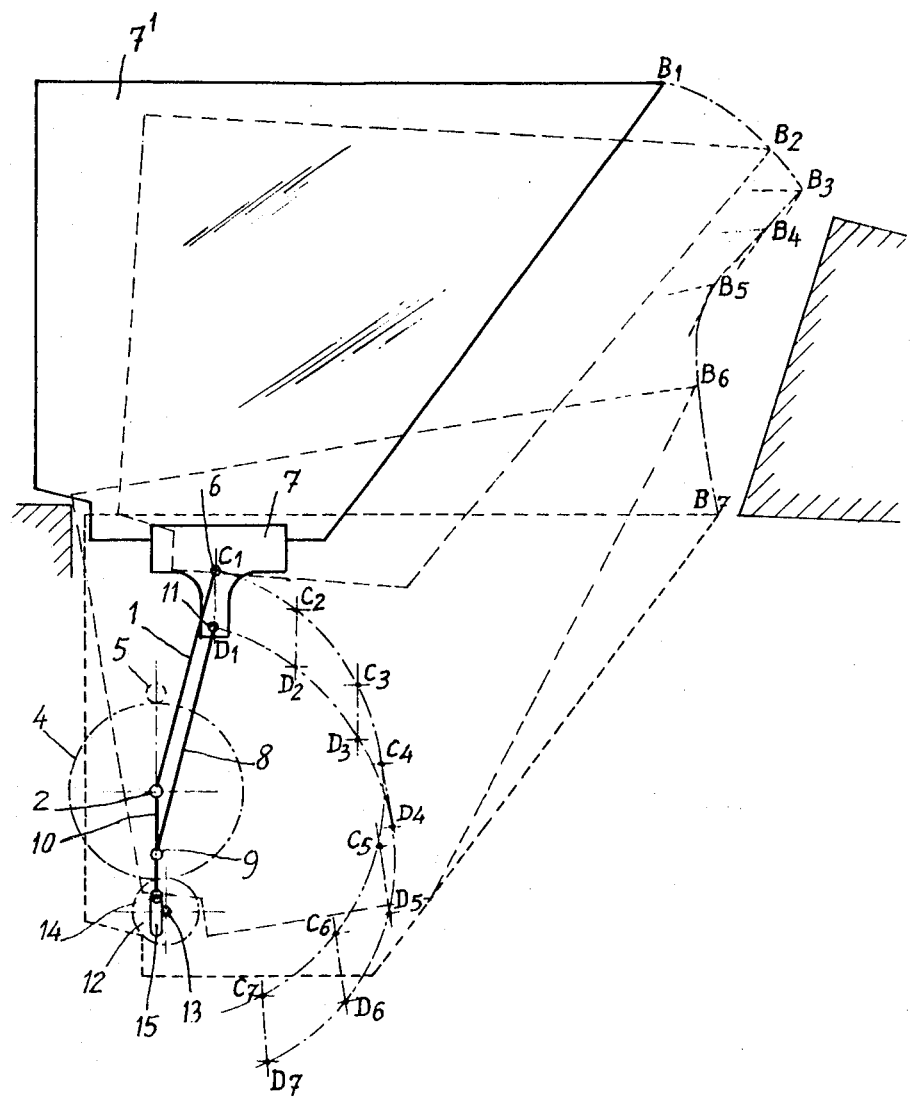
FIG. 2 illustrates diagrammatically the movement of a glass from its uppermost or closed position to its lowermost or fully open position in the same form of embodiment.

In FIG. 2 the movements of the component elements of the window regulator of this invention are shown in dash and dot lines.

Thus, curve $B_1, B_2, B_3......B_7$ designates the movement of the upper right-hand point of the glass from the uppermost position to the lowermost position thereof.

Curve $C_1, C_2, C_3......C_7$ designates the movement of the movable pivot pin 6 of the main link on the bracket 7.

Curve $D_1, D_2, D_3......D_7$ designated on the other hand the movement of the movable pivot pin 11 of the secondary link on the bracket.

It will be noted that this device is applicable to curved glass. Guide means in the form of rollers and/or shaped slideways may complete the glass holding already obtained by means of the weather strips and glass run channels. The improvements illustrated in FIGS. 3 and 4 are as follows:

The window regulator comprises means for guiding in the transverse direction the bracket 7 supporting the glass $7_1$, these means comprising a pair of guide rails 16 and 17 having a polygonal hollow girder contour or a contour with rounded sides, formed with a longitudinal slot on one of its main faces, and associated with rollers 18 and 19 carried by the bracket 7.

The rail 16 having either the shape of a circular arc concentric to the axis of rotation 2 of the main link 1 in the case of a plane glass, with the axis of rollers 18 coincident with the axis of said main link 1, or the shape of a cone in the case of a hollow or curved glass.

The rail 17 corresponds to the whole or part of the curved path described by the shaft of roller 19 at any point of bracket 7.

FIG. 4 shows a driving roller 18 contacting without play at 20 the inner faces of rail 16. The diameter of the roller supporting shaft 21 is small enough in relation to the slot 22, and the outer diameter 23 of this roller is also small enough in relation to the inner width 24 of rail 16, to avoid any interference with the kinematic motion resulting from the operation of the regulator mechanism.

The guiding action is obtained by means of rollers made preferably of noiseless material such as plastic and are characterized in that they engage the inner space of the groove without play but with the diameter of the driving shaft 21 and the outer diameter of the roller proper small enough in relation to the rail section to avoid any interference with the kinematic motion resulting from the operation of the regulator mechanism.

Moreover, with this device an adjustment of the glass tilting movement transversely to its plane of motion can be obtained by displacing either one of the guide rollers or one of the guide rails.

Finally, to avoid a possible tilting torque detrimental notably in case the thrust center is not coincident with the center of gravity of the glass, a tilting torque having a predetermined direction can be created on purpose by means of a resilient system consisting:

either of a tension spring disposed between the bracket engaging end of the main link 1 and a properly selected point of said bracket so that the distance between these two points increases from the closed-window position to the open-window position, or a resilient member such as a metal cable of the piano wire-type inserted in one of the guide rails in order to urge one of the guide rollers in a predetermined direction.

Of course, various modifications and variations may be brought to the specific forms of embodiment of the present invention which are shown and described herein, without departing from the scope of the invention as defined in the appended claims.

We claim:

1. A window regulator for automobiles comprising a glass-supporting bracket, winding means having a control pinion, a fixed pivot on said control pinion, a main link having one end connected to said fixed pivot pin to rotate with said control pinion, said main link having its opposite end pivoted to the glass-supporting bracket, a complementary link having one end connected to pivot about the fixed pivot pin of said main link and an elongated aperture formed in the other end of said complementary link, a secondary link having one end pivoted to said glass-supporting bracket and the other end pivotally connected to said complementary link, a pinion rotating about a fixed axis and in constant meshing engagement with the control pinion, an eccentric pin engaging in said aperture and being carried by said pinion, whereby the paths followed by said pivots on the glass-supporting bracket are of different arcs in order to cause glass carried thereby to follow a curved path.

2. A window regulator according to claim 1, wherein said main link comprises a spiral compensating spring.

3. A window regulator according to claim 1, further comprising curved glass mounted in said bracket.

4. A window regulator according to claim 1, further comprising means for guiding said glass-supporting bracket in a transverse direction, said guiding means comprising a pair of guide rails having a hollow girderlike cross-sectional contour formed with a longitudinal slot along one main face, rollers carried by said bracket engaging in said rails.

5. A window regulator according to claim 4, wherein for flat window glass one rail has the shape of a circular arc concentric to the rotation of the main link with the axis of the rollers being coincident with the axis of rotation of said main link.

6. A window regulator according to claim 4, wherein for curved glass one rail has the shape of a cone with the other rail representing at least part of the curve described by the axis of a second roller disposed on the glass-supporting bracket.

7. A window regulator according to claim 4, wherein said guide rollers are formed of noiseless material and are engaged without play within the corresponding guide rails, the diameter of roller supporting and driving shafts and the outer diameter of the rollers being small enough in relation to the rail cross-sectional dimension to avoid any interference with the kinematic motion resulting from the operation of the regulator.

8. A window regulator according to claim 4, further comprising means for adjusting the tilting movement of the glass transversely to its plane of movement by selectively displacing one of the guide rollers.

9. A window regulator according to claim 4, further comprising means for adjusting the tilting movement of the glass transversely to its plane of movement by selectively displacing one of the guide rails.

10. A window regulator according to claim 4, further comprising resilient means for producing a tilting torque in a predetermined direction, notably in case the center of thrust is not coincident with the center of gravity of the glass.

11. A window regulator according to claim 10, wherein said resilient means comprises a tension spring mounted between the end of the main link which is pivoted to said glass-supporting bracket and a point on said bracket so selected that the distance between these two points increases when the glass moves from its closed position to its open position.

12. A window regulator according to claim 10, wherein said resilient means comprises a metallic cable added in one of said guide rails for constantly urging one of the guide rollers in a predetermined direction.